US007062605B2

(12) United States Patent
Chatterjee et al.

(10) Patent No.: US 7,062,605 B2
(45) Date of Patent: Jun. 13, 2006

(54) METHODS AND STRUCTURE FOR RAPID BACKGROUND INITIALIZATION OF A RAID LOGICAL UNIT

(75) Inventors: Paresh Chatterjee, Fremont, CA (US); Chayan Biswas, Newark, CA (US); Ragendra Mishra, Fremont, CA (US); Basavaraj Hallyal, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 332 days.

(21) Appl. No.: 10/424,311

(22) Filed: Apr. 28, 2003

(65) Prior Publication Data

US 2004/0215877 A1    Oct. 28, 2004

(51) Int. Cl.
*G06F 12/00* (2006.01)

(52) U.S. Cl. .............................. 711/114; 713/1; 714/6; 711/170; 711/155; 711/156; 711/159

(58) Field of Classification Search .................... 714/6; 711/114, 144; 710/10, 17, 19; 707/200
See application file for complete search history.

(56) References Cited

U.S. PATENT DOCUMENTS

| | | | | |
|---|---|---|---|---|
| 5,313,626 A | * | 5/1994 | Jones et al. ..................... 714/5 |
| 5,943,689 A | * | 8/1999 | Tamer ........................ 711/166 |
| 6,467,023 B1 | * | 10/2002 | DeKoning et al. .......... 711/114 |
| 6,813,687 B1 | * | 11/2004 | Humlicek .................... 711/114 |
| 6,842,793 B1 | * | 1/2005 | Ohashi et al. .................. 710/5 |
| 2003/0018851 A1 | * | 1/2003 | Ikeuchi et al. .............. 711/114 |
| 2003/0120674 A1 | * | 6/2003 | Morita et al. ............... 707/100 |
| 2003/0233596 A1 | * | 12/2003 | Corbin et al. ................... 714/5 |
| 2004/0216012 A1 | * | 10/2004 | Ashmore et al. ............. 714/42 |
| 2004/0221102 A1 | * | 11/2004 | Watanabe .................... 711/112 |

* cited by examiner

*Primary Examiner*—Donald Sparks
*Assistant Examiner*—Jesse Diller
(74) *Attorney, Agent, or Firm*—Duft Bornsen & Fishman LLP

(57) ABSTRACT

Methods and structure for initializing a RAID storage volume substantially in parallel with processing of host generated I/O requests. Initialization of a RAID volume may be performed as a background task in one aspect of the invention while host generated I/O requests proceed in parallel with the initialization. The initialization may preferably the performed by zeroing all data including parity for each stripe to thereby make each stripe XOR consistent. Host generated I/O requests to write information on the volume may utilize standard read-modify-write requests where the entire I/O request affects information in a portion of the volume already initialized by background processing. Other host I/O requests use standard techniques for generating parity for all stripes affected by the write requests. These and other features and aspects of the present invention make a newly defined RAID volume available for host processing is quickly as possible.

4 Claims, 6 Drawing Sheets

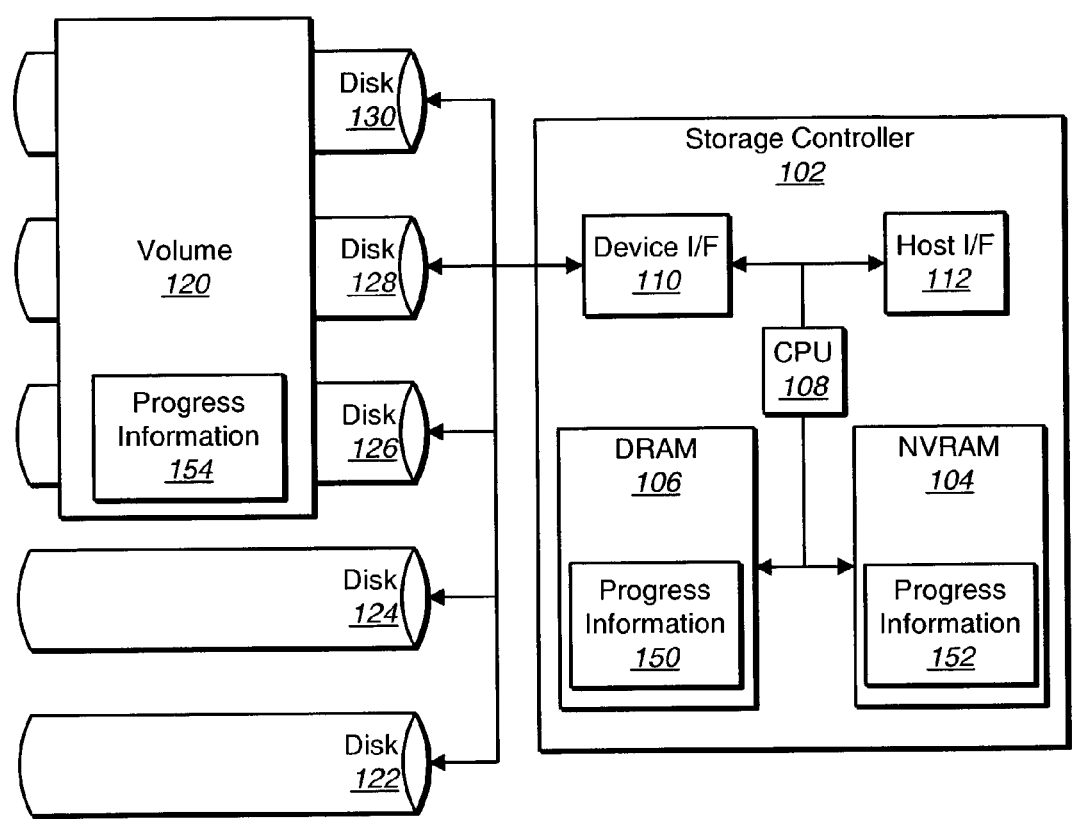
FIG._1

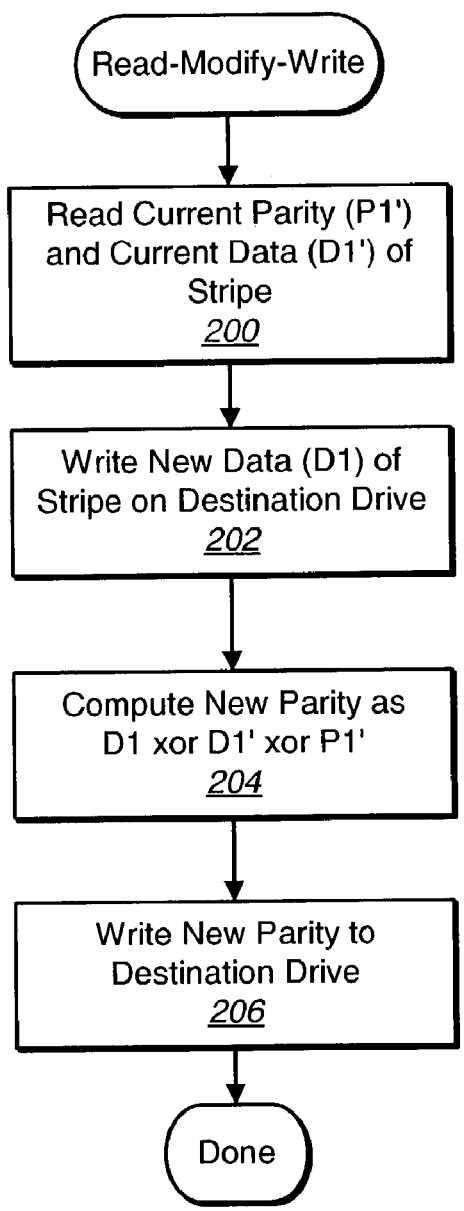
FIG._2
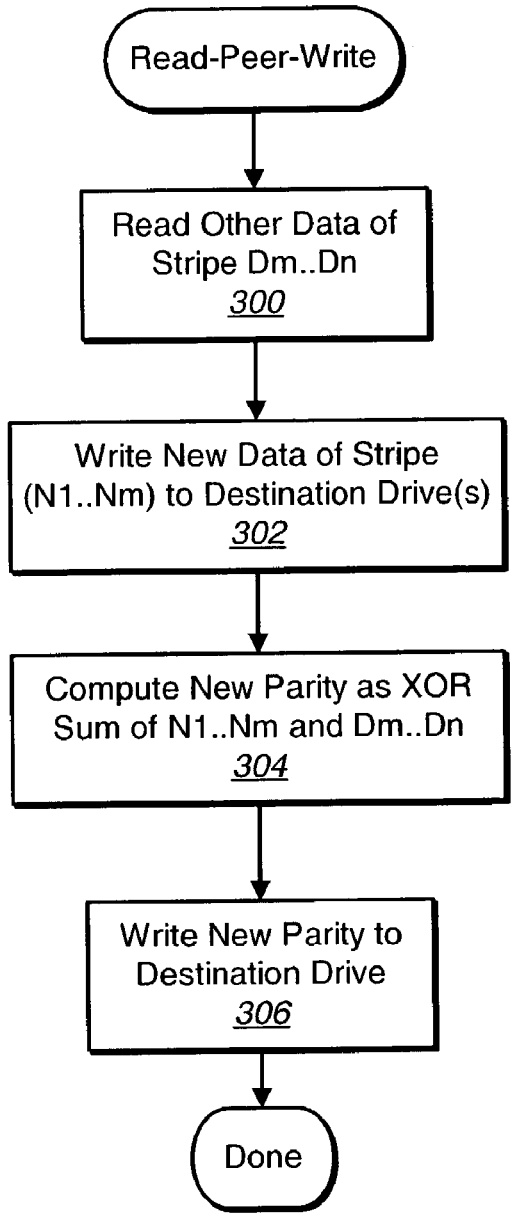
FIG._3

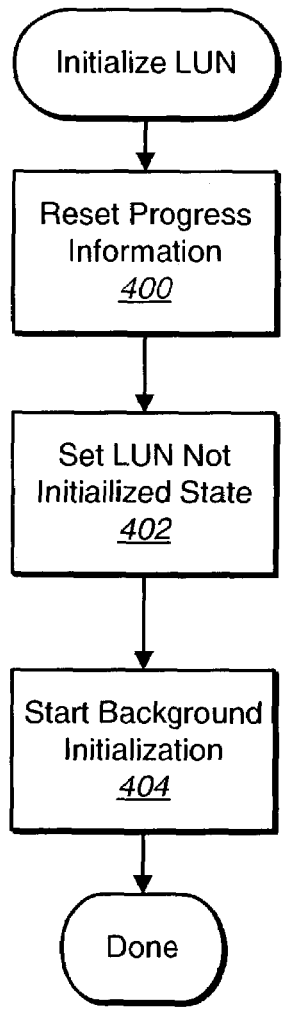
FIG._4
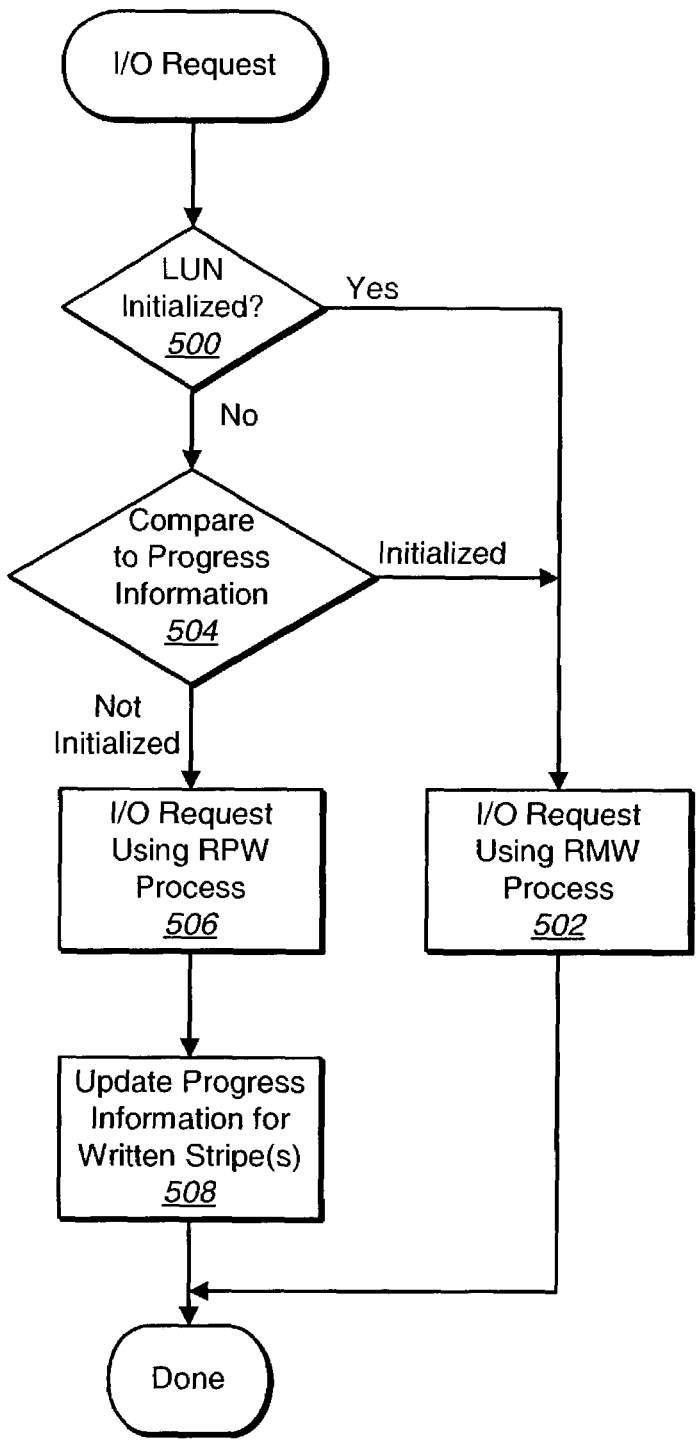
FIG._5

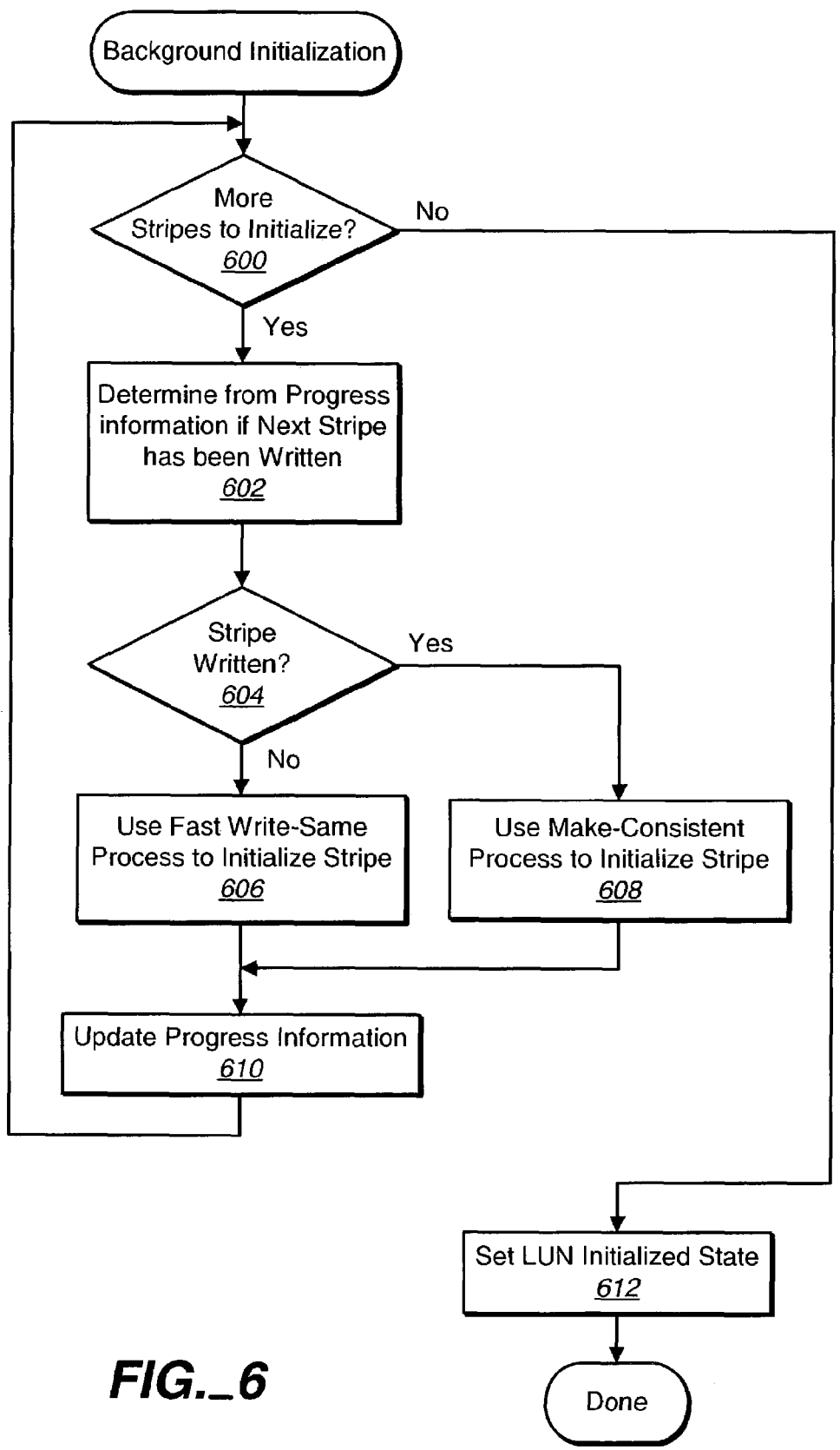
FIG._6

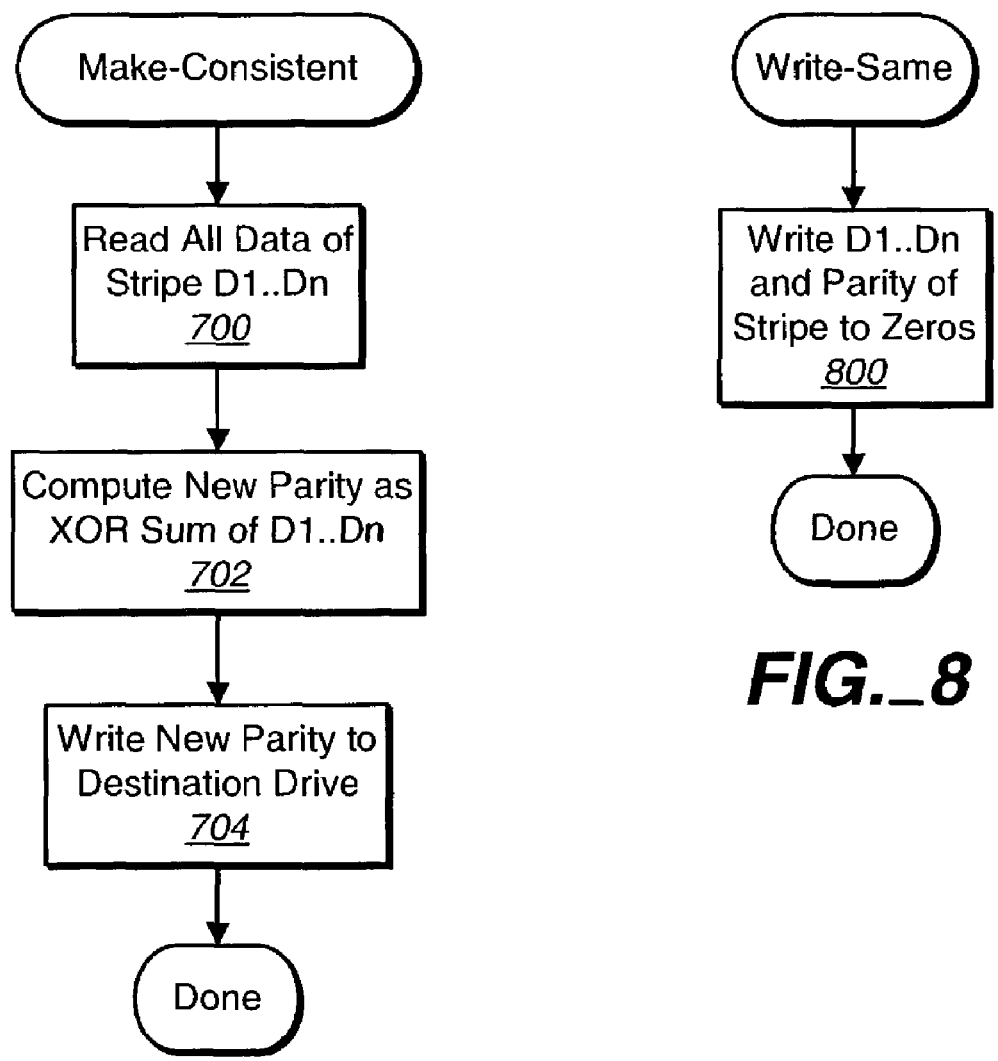

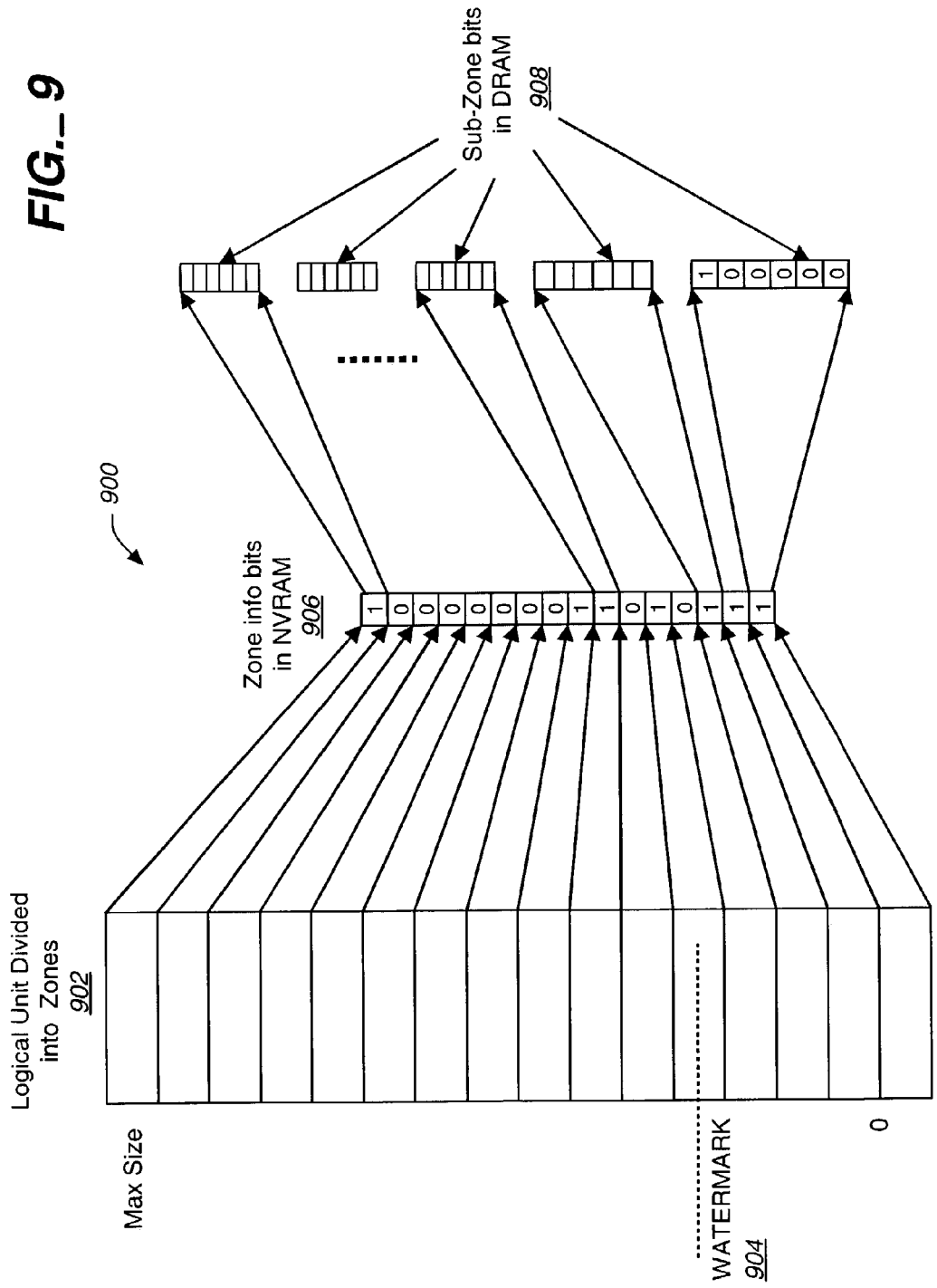
FIG._9

METHODS AND STRUCTURE FOR RAPID BACKGROUND INITIALIZATION OF A RAID LOGICAL UNIT

RELATED PATENTS

This patent is related to, commonly owned U.S. patent application Ser. No. 10/210,384 filed Aug. 1, 2002, entitled METHOD AND APPARATUS FOR COPYING DATA BETWEEN STORAGE VOLUMES OF STORAGE SYSTEMS and issued as U.S. Pat. No. 6,931,499, incorporated herein by reference (hereinafter the '384 application). This patent is also related to commonly owned U.S. Pat. No. 6,467,023, issued Oct. 15, 2002, entitled METHOD FOR LOGICAL UNIT CREATION WITH IMMEDIATE AVAILABILITY IN A RAID STORAGE ENVIRONMENT, incorporated herein by reference. This patent is also related to, commonly owned U.S. patent application Ser. No. 10/424,939, filed Apr. 28, 2003, entitled METHODS AND STRUCTURE FOR IMPROVED FAULT TOLERANCE DURING INITIALIZATION OF A RAID LOGICAL UNIT published as United States Patent Application Publication Number 2004/0216012, incorporated herein by reference.

BACKGROUND OF THE INVENTION

1. Field of the Invention

The invention relates generally to storage subsystems and more specifically relates to techniques for initializing a new logical unit as a background process substantially overlapped with host I/O request processing on the new logical unit.

2. Discussion of Related Art

As complexity of computing applications has evolved so to have demands for reliability and speed in associated storage subsystems. In general, computing storage subsystems are used for storage and retrieval of programs and data associated with operation of various programs. The mission critical nature of some applications has led to corresponding demands for increased reliability in storage subsystems. Further, high-performance storage related applications, such as multimedia data capture and replay, have contributed to increased demands for performance on storage subsystems.

RAID storage management techniques (Redundant Array of Independent Disks) have been employed for some time to enhance both performance and reliability in such high-performance, high reliability storage applications. Striping techniques applied within RAID storage management distribute stored data over multiple independent disk drives thereby enhancing storage performance by distributing storage and retrieval operations over a plurality of disk drives operable in parallel. Redundancy techniques employed within RAID storage subsystems enhance reliability of the storage subsystem by generating and maintaining redundancy information associated with the user supplied data. The redundancy information ensures that failure of any single disk drive does not risk loss of data and, in some cases, allows the RAID storage subsystem to continue operation (though often in a degraded mode).

RAID storage management encompasses a number of storage management techniques for distributing data (striping) and for generating, maintaining, and distributing redundancy information over a plurality of drives. Each of these RAID management techniques is typically referred to as a "level" such as RAID level 0, RAID level 1, RAID level 5, etc. One common RAID storage management technique, often referred to as RAID level 5, distributes user data over a plurality of drives and associates therewith an additional portion of data (redundancy information) generated by use of XOR parity operations. A stripe of data consists of distributed portions of user data and the associated redundancy information. A volume or logical unit (LUN) comprises a plurality of such stripes distributed over a subset of disk drives in the storage subsystem.

Typically a RAID controller, often integrated within the storage subsystem, applies RAID storage management techniques to store and retrieve such stripes on the disk drives of the storage subsystem. The RAID storage controller hides from the host systems information relating to the specific locations of individual portions of data and hides information regarding generation and maintenance of the required redundancy information. To an attached host computing system, the RAID storage controller makes a volume or logical unit appear essentially as a single, highly reliable, high-performance, high-capacity disk drive. In general, the RAID storage controller provides a mapping function from logical addresses or locations specified in host I/O requests to physical storage locations corresponding to the striped information distributed over multiple disks.

In RAID level 5 storage management (as well as other forms of RAID storage management such as RAID levels 6) it is important that a newly defined storage volume be made "XOR consistent". XOR consistency as used herein refers to the state of each stripe such that the data in the stripe and the associated redundancy information are consistent—i.e., the parity information corresponds to the associated data of the stripe. While RAID level 5 uses XOR parity, "XOR consistent" as used herein refers to any redundancy information stored in the array of disk drives that make up a volume. For example, XOR consistent may also refer to the redundancy information used in RAID level 6 and the mirrored redundancy information used in RAID level 1. Therefore, although the problems presented herein are discussed in detail with respect to RAID level 5, similar problems are encountered in other RAID management levels where a new volume must be initialized to make the redundant information ready for use.

When a new volume is defined by allocating portions of storage capacity distributed over a plurality of drives, the volume may initially include random data leftover from previous utilization of the disk drives or generated from some other source. In general, the initial information on a newly defined storage volume will not be XOR consistent.

A common technique applied to assure XOR consistency in a newly defined RAID level 5 volume is to read every block of data in a stripe, compute a corresponding XOR parity block, and write the newly computed XOR parity block to the appropriate location for the redundancy information of the stripe. Though data of the stripe may be meaningless (i.e., leftover) the stripe will then be XOR consistent. Such a process can be very time-consuming where the newly defined RAID level 5 volume is particularly large. Typically during such an initialization process, the RAID storage controller makes the volume (logical unit) unavailable for storage or retrieval of information by an attached host system. Frequently, such an extended delay in availability of the new volume is unacceptable.

Another prior technique described in the '023 patent allows I/O requests to be processed during initialization of a newly defined RAID level 5 volume. As the initialization process proceeds, a threshold indicator tracks its progress. If a host I/O request uses stripes that fall below the progress threshold, the request is handled normally. I/O requests are requeued for later processing by the controller if any part of the request involves uninitialized portions of the new volume. This prior technique allows the logical unit to be referenced by an attached host systems but defers the actual I/O operations until appropriate portions of the newly defined logical unit have been initialized (i.e., made XOR consistent).

A similar problem is addressed in the '384 application where a logical unit is migrated to another logical unit. The methods and structures discussed therein permit I/O operations to proceed substantially in parallel with the data copying operation.

It is evident from the above discussion that an ongoing problem exists in making a newly defined RAID volume available for host I/O request processing as soon as possible.

SUMMARY OF THE INVENTION

The present invention solves the above and other problems, thereby advancing the state of the useful arts, by providing methods and structure for performing initialization of a newly defined RAID logical unit as a background processing task and for substantially simultaneously processing host system I/O requests during the initialization process. More specifically, background initialization processing makes stripes on the newly defined RAID volume XOR consistent by writing all zeros to data blocks associated with the newly defined volume. A data structure associated with the methods of the present invention provides information regarding progress of the background initialization process. Host I/O requests to write information in a portion of the newly defined volume for which initialization has completed may be performed using standard read-modify-write (RMW) operations to affected stripes. Host generated I/O requests to write information in portions of the newly defined volume for which initialization has not completed are performed by generating parity for the entire stripe affected by the I/O request and writing the generated parity along with the affected data thereby making the affected stripe XOR consistent. The latter approach is often referred to as a read-peer-write process in that it reads the peers of the affected data blocks (the other blocks of the stripe) and determines the new parity information to be written back. Any write operations performed (either using read-modify-write or read-peer-write) record progress information used by the background initialization process to identify stripes that may not be cleared by the zeroing of blocks.

A feature of the invention therefore provides method for initializing a storage volume comprising: making the volume XOR consistent; and processing an I/O request received from an attached host system substantially in parallel with the step of making the volume XOR consistent.

Another aspect of the invention further provides for storing first progress information regarding the step of making the volume XOR consistent in a non-volatile memory.

Another aspect of the invention provides that the step of processing further comprises: determining if the I/O request affects only portions of the volume already made XOR consistent; performing the I/O request using read-modify-write processing if the I/O request affects only portions of the volume already made XOR consistent; and performing the I/O request using read-peer-write processing if the I/O request affects any portion of the volume not already made XOR consistent.

Another aspect of the invention further provides that the step of performing read-peer-write processing further comprises: storing second progress information in a memory indicating portions of the volume made XOR consistent by the read-peer-write processing.

Another aspect of the invention further provides that the step of making further comprises: determining from the first progress information and from the second progress information whether a portion of the volume to be initialized has been modified by read-peer-write processing; making the portion XOR consistent using write-same logic to clear the portion if the portion has not been modified by read-peer-write processing; making the portion XOR consistent using write-parity logic to compute parity if the portion has been modified by read-peer-write processing; and updating the first progress indicator to indicate completion of making the portion XOR consistent.

Another aspect of the invention further provides for dividing the volume into a plurality of zones, wherein the step of storing first progress information further comprises: storing threshold indicia indicative of the progress of the step of making the volume XOR consistent wherein zones below the threshold indicia have been made XOR consistent and wherein zones above the threshold indicia are not yet XOR consistent, and wherein the step of storing second progress information further comprises: storing a zone bitmap structure in the non-volatile memory wherein each bit of the zone bitmap structure corresponds to a zone of the plurality of zones and wherein each bit of the zone bitmap structure indicates whether processing of an I/O request has modified any portion of the corresponding zone of the volume.

Another aspect of the invention further provides for dividing each zone into a plurality of sub-zones, wherein the step of storing second progress information further comprises: storing a sub-zone bitmap structure in a memory wherein each bit of the sub-zone bitmap structure corresponds to a sub-zone of the plurality of sub-zones and wherein each bit of the sub-zone bitmap structure indicates whether processing of an I/O request has modified any portion of the corresponding sub-zone of the volume.

Another aspect of the invention further provides that the step of making further comprises: determining from the first progress information and from the second progress information whether a portion of the volume to be initialized has been modified by read-peer-write processing; making the portion XOR consistent using write-same logic to clear the portion if the portion has not been modified by read-peer-write processing; making the portion XOR consistent using write-parity logic to compute parity if the portion has been modified by read-peer-write processing; and updating the first progress indicator to indicate completion of making the portion XOR consistent.

Another aspect of the invention further provides for pausing the step of making the volume XOR consistent; saving the first progress information and the second progress information on disk drives of the volume; restoring the saved first progress information and the saved second progress information from disk drives of the volume; and resuming the step of making the volume XOR consistent in accordance with the restored first progress information and the restored second progress information.

Another feature of the invention provides a storage system comprising: a plurality of disk drives; and a storage controller coupled to the plurality of disk drives and adapted to receive and process I/O requests from an attached host system, wherein the storage controller is adapted to define a volume comprising a portion of each of one or more disk drives of the plurality of disk drives, and wherein the storage controller is adapted to make the volume XOR consistent substantially in parallel with processing of I/O requests from the attached host system.

BRIEF DESCRIPTION OF THE DRAWINGS

FIG. 1 is a block diagram of an exemplary storage system embodying features and aspects of the invention.

FIG. 2 is a flowchart describing a read-modify-write process.

FIG. 3 is a flowchart describing a read-peer-write process.

FIG. 4 is a flowchart of a storage volume initialization process.

FIG. 5 is a flowchart of an I/O request processing method.

FIG. 6 is a flowchart of a process for background initialization of a volume.

FIG. 7 is a flowchart of a process to make a portion of a volume XOR consistent.

FIG. 8 is a flowchart of a process to write a portion of a volume to force it to be XOR consistent.

FIG. 9 is a block diagram depicting structures useful to indicate progress of background initialization processing.

DETAILED DESCRIPTION OF THE DRAWINGS

FIG. 1 is a block diagram of a storage system 100 advantageously applying features and aspects of the present invention to improve initialization of a storage volume within the storage system. Storage system 100 may include a plurality of disk drives 122 through 130. Storage controller 102 manages interaction with the disk drives to achieve desired reliability, performance and host interaction. Volume 120 may be defined by such a storage controller 102 as a logical partition of the available storage space defined by disks 122 through 130. In general, such a volume 120 comprises a portion of the capacity of one or more of the available disk drives in the storage system. The portion may comprise any fraction of the available capacity of each disk drive up to and including the entirety of each disk drive. As shown in FIG. 1, exemplary volume 120 comprises a portion of each of disk drives 126, 128 and 130.

Storage controller 102 may include a CPU 108 for controlling operation of the controller and overall management of the storage system. CPU 108 may be coupled to DRAM 106 for storage and retrieval of information. Information stored in such DRAM may include program instructions, cache data buffers, and initialization progress information 150 (as discussed further herein below). CPU 108 may also store information in nonvolatile memory (NVRAM) 104. Examples of information stored in such a nonvolatile memory may include, configuration information and initialization progress information 152 (as discussed further herein below).

CPU 108 may also be coupled to attached host computing systems (not shown) via host interface 112. Still further, CPU 108 may be coupled to disk drives 122 through 130 via device interface 110. Host interface 112 couples the storage controller 102 to any of a number of well-known, commercially available or customized communication media for exchanging information with attached host systems. Exemplary of such communication media are Fibre Channel, parallel SCSI, etc. Still further, storage controller 102 is coupled through device interface 110 to disk drives 122 through 130 via any of several well-known, commercially available or customized communication media. Examples of such communication media for exchange of information between storage controller 102 and disk drives 122 through 130 are Fibre Channel, parallel SCSI, etc. Those of ordinary skill in the art will readily recognize numerous equivalent communication media and protocols for coupling a storage subsystem storage controller 102 to attached host systems and to disk drives within the storage subsystem. Further, those of ordinary skill in the art will readily recognize numerous equivalent structures for the design of storage controller 102. Additional components may be resident within such a storage controller and may be interconnected using any of several structures as well-known in the art. In addition, those of ordinary skill in the art will recognize that in high reliability and/or high-performance storage system applications, it may be common to utilize multiple storage controller devices for improved reliability through redundancy, for improved performance through parallel operation, or both. Is also common that redundant communication media paths may be employed to improve reliability and performance. FIG. 1 is therefore merely intended as exemplary of one possible storage system configuration in which features and aspects of the present invention may be beneficially applied.

In FIG. 1 it may be noted that initialization progress information may be stored in the various memory devices associated with the storage subsystem. Initialization progress information 150 may be generated and maintained within DRAM 106, progress information 152 may be maintained within nonvolatile memory 104 and progress information 154 may be maintained on a portion of volume 120. Features and aspects of the present invention generally provide for improved operations for initialization of volume 120. As noted above, in many storage system applications, a newly defined volume 120 must be initialized. In particular, in RAID storage management subsystems, a RAID volume must be initialized to make it XOR consistent. As noted above, XOR consistent as used herein refers to a state of the volume wherein redundancy information associated with a RAID management of the volume is consistent with the associated data of the volume. For example, in RAID level 5 storage management, XOR parity information associated with data of the volume must be made consistent with the data stored on a newly defined volume. Similarly, RAID level 6 storage management utilizes multiple forms of such redundant information and must be made consistent following definition of a new volume. Still further, RAID level 1 provides for complete mirroring of data and therefore must be made consistent in that a full mirror must be generated from the existing data of the volume. "XOR consistent" therefore means more generally redundant information is consistent with its associated data in a newly defined volume.

Storage controller 102 of FIG. 1 is generally operable to perform such initialization of a newly defined volume 120. Various structures generated and maintained within any, or all of progress information 150, 152 and 154 are used to track progress of the initialization of a newly defined volume 120. The progress information is used to allow overlapped, parallel operations of both I/O request processing and initialization of a newly defined volume. Whereas in the past, initialization of a volume could impose significant delays on processing of any I/O requests, features and aspects of the present invention utilize initialization progress information and shown in FIG. 1 to coordinate such overlap of I/O request processing and volume initialization.

FIG. 4 is a flowchart describing a method of the present invention for initializing a newly defined volume (LUN) as a background process while allowing processing of I/O requests in parallel therewith. Element 400 is first operable to reset progress information regarding the initialization process. As discussed further herein below, progress information may include a threshold or watermark indicator indicative of the progress of background initialization. In addition, progress information reset by element 400 may include data structures indicative of I/O request operations performed in parallel with the background initialization process. All such structures are reset as appropriate by operation of element 400. Element 402 is then operable to set state information indicating that the volume or LUN being initialized is not presently initialized. This state information may be used as discussed further herein below to adapt processing of I/O requests as required for an initialized vs. uninitialized volume. Element 404 is operable to commence background processing of the initialization task for the newly defined volume. Initialization of the newly defined volume proceeds as a background task in parallel with processing of I/O requests from attached host systems. Background volume initialization and I/O request processing are coordinated through updates to the progress information initially reset by operation of element 400.

As noted above, progress information may include a threshold or watermark indicator of the progress of initialization process. Further, progress information may include data structures indicative of I/O request processing performed substantially in parallel with the initialization process. The initialization process and I/O request processing features cooperate and coordinate through such shared progress information to allow both processes to proceed substantially in parallel. FIG. 9 shows exemplary structure representative of such progress information.

Progress information 900 may include a first progress indicator or first progress information as watermark indicator 904. Watermark indicator 904 may be updated periodically as background initialization processing proceeds. Watermark indicator 904 may be updated as each stripe is initialized in the volume or may be updated less frequently as groups of stripes are initialized. Watermark indicator 904 may be stored in any suitable memory structure including, for example, a nonvolatile memory component associated with the storage controller or, for example, a reserved progress information area within the volume being initialized. If the watermark indicator 904 is stored in a nonvolatile memory structure (including, for example, a reserved area of the volume being initialized), the initialization process may be paused and resumed in response to a power outage, a normal shutdown procedure, or other interruption of the initialization process. Stripes of the volume may be grouped into "zones" 902 as shown in FIG. 9. As shown FIG. 9, watermark indicator 904 indicates progress of background initialization through some stripe approximately in the middle of the fifth defined zone of the logical unit or volume being initialized.

A data structure may be provided as a second progress indicator or second progress information indicating zones in which I/O requests have been processed substantially in parallel with the background initialization task. In one exemplary embodiment, zone bitmap structure 906 may be defined having one storage bit associated with each defined zone of the volume being initialized. Such a zone bitmap structure 906 may be stored in nonvolatile memory associated with the storage controller or may be stored in a reserved portion of the volume being initialized or other nonvolatile memory components.

The bitmap representation of such a structure is a compact, rapidly accessible structure for determining whether any I/O request operation was performed in the associated zone. If such a request is performed, the associated zone's bitmap structure bit may be set. Where no I/O request has been processed in the corresponding zone during the background initialization process, the associated zone bitmap bit may be reset.

The number of the zones defined within the logical unit being initialized, and hence the number of bits in the zone bitmap structure 906 may be determined largely in accordance with capacity of the nonvolatile memory component associated with the storage controller. Often, a nonvolatile memory component within a storage controller is costly and hence sparingly utilized. Where, for example, only 64 bits or 128 bits of nonvolatile memory may be allocated for the zone bitmap structure, the number of zones 902 within the volume being initialized would also be limited correspondingly to 64 or 128. Each zone 902 therefore may include a significant number of stripes within the total capacity of the volume being initialized. Zone bitmap structure 906 therefore includes single bits indicating whether any of the plurality of stripes within the corresponding zone have been modified by parallel processing of an I/O request.

The background initialization process may determine how to most rapidly initialize stripes in each zone by referring to the zone bitmap structure 906. Where the zone bitmap bit corresponding to the zone including the next stripe indicates that no stripes have been modified by parallel processing of I/O request, the initialization process may applying a rapid initialization technique to initialize each stripe in that zone. However, where the zone bitmap structure for a particular zone indicates some stripes have been modified, the initialization process may need to more carefully analyze whether the rapid initialization may be utilized. To permit the initialization process to determine with finer granularity which stripes of a particular zone have been modified, sub-zones may be defined within each zone. A sub-zone may be any portion of the stripes within the corresponding zone. Sub-zone data structure 908 may be implemented as a bitmap structure where the number of bits corresponds to the number of sub-zones within the corresponding zone.

Because the sub-zone bitmap structure 908 may be substantially larger than the zone bitmap structure 906, the sub-zone bitmap structure 908 may preferably be stored in less costly, more abundant DRAM or other nonvolatile memory associated with the storage controller. Where the storage controller memory capacity so permits, sub-zones may be defined to the level of granularity of a particular stripe. Thus, each bit of a sub-zone bitmap structure 908 corresponds to one stripe of the corresponding zone. Where memory capacity for storing the sub-zone bitmap structure 908 is more limited, the sub-zone may represent multiple stripes but still a smaller group than that of the zone. Aspects and features of the present invention may then utilize the zone bitmap structure 906 and sub-zone bitmap structure 908 in combination to determine more precisely which stripes of a zone have been modified by parallel processing of an I/O request. In particular, background initialization processing may inspect a zone bitmap structure to determine if any stripes in a corresponding zone have been modified by an I/O request. If the zone bitmap element indicates that some stripe has been modified, the corresponding sub-zone structure may be inspected to determine exactly which stripes have been modified.

Use of the exemplary data structures of FIG. 9 will be further defined with reference to methods discussed herein.

The data structures for generation and maintenance of first and second progress information depicted in FIG. 9 are intended as merely representative of one of a number of equivalent structures readily apparent to those of ordinary skill in the art. Further, those of ordinary skill in the art will recognize that the structures may be stored in any appropriate memory medium associated with the storage controller. Preferably some or all of the various progress information structures may be stored in a nonvolatile memory so that initialization may proceed where interrupted following, for example, interruption by power failure or other reset logic.

FIGS. 5 and 6 are flowcharts describing operation of an exemplary I/O request processing method and an exemplary background initialization method, respectively. In particular the process of FIG. 5 is operable in response to receipt of an I/O write request from an attached host system. Element 500 first determines if the affected logical unit (volume) has already completed initialization (i.e., is in an initialized state as discussed above). If so, element 502 is operable to perform normal I/O request processing using read-modify-write (RMW) or other I/O request processing techniques for standard I/O write request processing. If element 500 determines that the affected volume has not yet been fully initialized, element 504 is next operable to inspect the threshold or watermark progress information discussed above to determine whether the initialization process has progressed sufficiently to initialize the area affected by the present I/O request. If so, element 502 is operable as above to complete the I/O request processing using RMW or other I/O write processing techniques. If element 504 determines that the affected portion of the volume has not yet been initialized, element 506 is operable to perform the desired I/O write request using read-peer-write processing as discussed further below. Read-peer-write processing, though slower than standard RMW processing, ensures that the affected stripe will be made XOR consistent by virtue of the I/O request processing. Element 508 is then operable to update the progress information to indicate the stripes affected by processing of the I/O write request. As noted above, element 508 may update zone and sub-zone bitmap structures indicating the stripes affected by the processing of the I/O request.

As discussed above, I/O request processing may use RMW processing techniques or read-peer-write processing techniques. FIG. 2 is a flowchart describing an exemplary read-modify-write (RMW) operation. In general, an RMW operation is used for writing information in a RAID storage subsystem where redundancy information must be updated in response to the updating of a portion of associated stripe data. For example, in a RAID level 5 or RAID level 6 storage volume, a stripe consists of a number of blocks or portions of data, each on one of the plurality of disk drives associated with the volume. In addition, the stripe includes redundancy information associated with the data portion of the stripe. Where an I/O request writes to a portion of the data of a stripe in a volume, RMW processing may be invoked to rapidly update the affected data and redundancy portions of the stripe.

Element 200 of FIG. 2 is first operable to read the present data about to be updated (D1') and the present parity portion of the stripe (P1'). Element 202 then writes the new data portion (D1) of the stripe on the appropriate destination drive or drives of the storage system. The I/O request may update only a portion of the stripe represented by D1. That portion may span one or more disk drives of the volume. Element 204 then computes a new parity portion of the stripe as the XOR sum of the modified data portion (D1), the previous parity information (P1') and the previous data information (D1'). Lastly, element 206 is operable to write the newly computed parity information to the appropriate destination drives of the storage system.

By contrast, FIG. 3 describes a method for read-peer-write (RPW) processing of an I/O request. Where they parity information of an affected stripe is not presently known to be XOR consistent, an RPW operation will ensure that the stripe becomes XOR consistent by virtue of the write operations. Element 300 first reads all unaffected data portions of the affected stripe (Dm . . . Dn). Element 302 then writes the new data portion of the affected stripe to appropriate destination drives. Affected portions of the stripe are represented as N1 . . . Nm. Element 304 is then operable to compute parity for the affected stripe as the XOR sum of the new data portions (N1 . . . Nm) and unaffected data portions (Dm . . . Dn). Lastly, element 306 is operable to write the newly computed parity to an appropriate destination drive for the affected stripe. Where the new data (N1 . . . Nm) represents the entirety of the stripe, hence no additional portions of data need be read by operation of element 302, the RPW operation is then often referred to as a full stripe write operation.

The RMW processing of FIG. 2 and the RPW processing of FIG. 3 may be readily adapted by those of ordinary skill in the art to process multiple stripes where some of the multiple stripes are processed as "full stripe" write operations and other partial stripe modifications may be processed either as RMW or RPW operations.

FIG. 6 is a flowchart of an exemplary background initialization process associated with aspects of the present invention to provide rapid, background initialization of a volume substantially in parallel with I/O request processing as discussed above with respect to FIG. 5. Once initiated, element 600 (of FIG. 6) first determines whether more stripes of the volume remained to be initialized (made XOR consistent). If not, initialization of the volume completes with element 612 marking the logical unit (volume) as now in the initialized state. As noted above, the initialized state allows I/O request processing to proceed normally. If element 600 determines that additional stripes remain to be initialized in the logical unit, element 602 is next operable to determine from the progress information whether the next stripe to be initialized has already been written by processing of an I/O request. In particular, element 602 may inspect the zone and sub-zone bitmap structures to determine whether this particular stripe has been previously written by an I/O request processed in parallel with the background initialization task. If element 604 determines that the stripe has been written, element 608 is next operable to use a make-consistent process to ensure initialization of the stripe (as discussed further below).

Where the zone and sub-zone progress information as discussed above provides sufficient granularity to know precisely which stripes have been written, processing of element 608 is unnecessary in that the RPW processing performed by the earlier I/O request has already ensured XOR consistency of the associated stripe. However, where the granularity of the zone and sub-zone information does not specify individual stripes but rather groups of stripes, element 608 may be performed to ensure XOR consistency of the stripe.

Where element 604 determines that the next stripe has not been written by a previous I/O request, element 606 is next operable to use a write-same process as discussed further herein below to ensure XOR consistency of the next stripe. In both cases, following operation of element 606 and 608, element 610 is operable to update progress information to indicate further progress of the background initialization process. In particular, element 610 may update the threshold or watermark indicator discussed above to indicate further progress in the initialization process. Processing then continues by looping back to element 600 to continue initializing further stripes of the volume.

FIG. 7 is a flowchart showing details of an exemplary make-consistent process as discussed above with respect to element 608. The make-consistent process is essentially identical to the RPW processing discussed above with respect to FIG. 3 except that no new data is provided. Rather, element 700 reads all data portions of the stripe (D1 . . . Dn). Element 702 then computes a new parity portion of the stripe as the XOR sum of all data portions (D1 . . . Dn). Element 704 is then operable to write the newly computed parity information to the appropriate destination drive of the stripe. The method of FIG. 7 may also be referred to herein as "write-parity" logic in that only updated parity information is written thereby.

FIG. 8 is a flowchart describing and exemplary process for implementing the write-same procedure for fast initialization of a stripe. In particular, element 800 is operable to write all data portions and the associated parity portion of the stripe to zeros. An all zero stripe is XOR consistent as regards typical XOR parity of RAID level 5. For other RAID level systems, similar fast write operations may be utilized to effectuate rapid initialization of an associated stripe. In general, element 800 is operable to perform the fastest operation possible to make a given stripe XOR consistent where the data portion does not presently have relevant data to be retained.

Further aspects of the present invention allow for improved utilization of costly nonvolatile memory as compared to less costly, more abundant DRAM devices. In one exemplary embodiment, the zone bitmap structure may be stored in nonvolatile memory. Typically such nonvolatile memory is slower to read and write as compared to less costly DRAM components. Therefore, in one aspect of the invention, the zone bitmap structure is written both to nonvolatile memory and substantially simultaneously written to a shadow copy in DRAM. The nonvolatile version may be used to recover from a power reset or other interruption of initialization process while the DRAM version may be used as a shadow copy for more rapid read access to the zone bitmap data structure.

All progress information, including the watermark indicator, zone bitmap structure and sub-zone bitmap structure, may be persistently stored in a nonvolatile memory to allow orderly shutdown of the storage system during an initialization process and orderly resumption of the interrupted initialization process. Upon resumption of the initialization process, all progress information may be restored from the nonvolatile memory into appropriate locations of volatile and other nonvolatile memory to continue the initialization process where interrupted.

Further aspects of the present invention to allow dynamic allocation and compacting ("garbage collection") for the elements of progress information stored in DRAM or other memory. As background initialization proceeds from beginning to end of the new volume, zone and sub-zone bitmap structures for portions of the volume already initialized may be released, compacted and reallocated for the remaining volume initialization. Such compaction and reallocation may permit finer granularity in the zone and sub-zone definition as the initialization proceeds. Such compaction ("garbage collection") programming techniques may be implemented as appropriate to the particular data structures chosen for implementation of the progress information. Well-known programming paradigms for such dynamic allocation and control of memory are generally known to those of ordinary skill in the art.

While the invention has been illustrated and described in the drawings and foregoing description, such illustration and description is to be considered as exemplary and not restrictive in character. One or more exemplary embodiments of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for initializing a storage volume comprising:
making the volume XOR consistent;
processing an I/O request received from an attached host system substantially in parallel with the step of making the volume XOR consistent; and
storing first progress information regarding the step of making the volume XOR consistent in a non-volatile memory,
wherein the step of processing further comprises:
determining if the I/O request affects only portions of the volume already made XOR consistent;
performing the I/O request using read-modify-write processing if the I/O request affects only portions of the volume already made XOR consistent; and
performing the I/O request using read-peer-write processing if the I/O request affects any portion of the volume not already made XOR consistent,
wherein the step of performing read-peer-write processing further comprises:
storing second progress information in a memory indicating portions of the volume made XOR consistent by the read-peer-write processing,
wherein the step of making further comprises:
determining from the first progress information and from the second progress information whether a portion of the volume to be initialized has been modified by read-peer-write processing;
making the portion XOR consistent using write-same logic to clear the portion if the portion has not been modified by read-peer-write processing;
making the portion XOR consistent using write-parity logic to compute parity if the portion has been modified by read-peer-write processing; and
updating the first progress indicator to indicate completion of making the portion XOR consistent.

2. A method for initializing a storage volume comprising:
making the volume XOR consistent;
processing an I/O request received from an attached host system substantially in parallel with the step of making the volume XOR consistent;
storing first progress information regarding the step of making the volume XOR consistent in a non-volatile memory;
wherein the step of processing further comprises:
determining if the I/O request affects only portions of the volume already made XOR consistent;
performing the I/O request using read-modify-write processing if the I/O request affects only portions of the volume already made XOR consistent; and performing the I/O request using read-peer-write processing if the I/O request affects any portion of the volume not already made XOR consistent, wherein the step of performing read-peer-write processing further comprises:

storing second progress information in a memory indicating portions of the volume made XOR consistent by the read-peer-write processing, dividing the volume into a plurality of zones, wherein the step of storing first progress information further comprises:

storing threshold indicia indicative of the progress of the step of making the volume XOR consistent wherein zones below the threshold indicia have been made XOR consistent and wherein zones above the threshold indicia are not yet XOR consistent, and wherein the step of storing second progress information further comprises:

storing a zone bitmap structure in the non-volatile memory wherein each bit of the zone bitmap structure corresponds to a zone of the plurality of zones and wherein each bit of the zone bitmap structure indicates whether processing of an I/O request has modified any portion of the corresponding zone of the volume;

dividing each zone into a plurality of sub-zones, wherein the step of storing second progress information further comprises:

storing a sub-zone bitmap structure in a memory wherein each bit of the sub-zone bitmap structure corresponds to a sub-zone of the plurality of sub-zones and wherein each bit of the sub-zone bitmap structure indicates whether processing of an I/O request has modified any portion of the corresponding sub-zone of the volume, wherein the step of making further comprises:

determining from the first progress information and from the second progress information whether a portion of the volume to be initialized has been modified by read-peer-write processing;

making the portion XOR consistent using write-same logic to clear the portion if the portion has not been modified by read-peer-write processing;

making the portion XOR consistent using write-parity logic to compute parity if the portion has been modified by read-peer-write processing; and updating the first progress indicator to indicate completion of making the portion XOR consistent.

3. A storage system comprising:

a plurality of disk drives;

a storage controller coupled to the plurality of disk drives and adapted to receive and process I/O requests from an attached host system, wherein the storage controller is adapted to define a volume comprising a portion of each of one or more disk drives of the plurality of disk drives, and wherein the storage controller is adapted to make the volume XOR consistent substantially in parallel with processing of I/O requests from the attached host system;

a first progress indicator stored in a non-volatile memory indicating progress in operation of the storage controller to make the volume XOR consistent, wherein the storage controller is further operable to perform the I/O request using read-modify-write processing if the I/O request affects only portions of the volume already made XOR consistent as indicated by the progress indicator, and wherein the storage controller is further operable to perform the I/O request using read-peer-write processing if the I/O request affects any portion of the volume not already made XOR consistent as indicated by the progress indicator; and a second progress indicator indicating portions of the volume made XOR consistent by the read-peer-write processing, wherein the first progress indicator comprises:

a threshold indicator periodically updated to reflect progress in making the volume XOR consistent, wherein the second progress indicator comprises a bitmap structure comprising a plurality of bits wherein each bit corresponds to a zone of a plurality of zones of the volume and wherein each bit indicates whether any potion of the corresponding zone has been made XOR consistent by operation of a read-peer-write operation.

4. The storage system of claim 3 wherein the storage controller is further operable to determine from the first progress indicator and from the second progress indicator whether a portion of the volume to be initialized has been modified by read-peer-write processing, wherein the storage controller is further operable to make the portion XOR consistent using write-same logic to clear the portion if the portion has not been modified by read-peer-write processing, wherein the storage controller is further operable to make the portion XOR consistent using write-parity logic to compute parity if the portion has been modified by read-peer-write processing.

* * * * *